United States Patent [19]

McDonald

[11] Patent Number: 5,418,678
[45] Date of Patent: May 23, 1995

[54] MANUALLY SET GROUND FAULT CIRCUIT INTERRUPTER

[75] Inventor: Thomas M. McDonald, Monroe, Conn.

[73] Assignee: Hubbell Incorporated, Orange, Conn.

[21] Appl. No.: 115,020

[22] Filed: Sep. 2, 1993

[51] Int. Cl.[6] ............................................. H02H 3/16
[52] U.S. Cl. ........................................ 361/46; 361/50;
361/114; 335/27; 335/19; 335/20
[58] Field of Search ................... 361/45, 42, 49, 114,
361/115, 87, 50, 46; 335/18, 19, 20, 26, 27

[56] References Cited

U.S. PATENT DOCUMENTS

| | | | |
|---|---|---|---|
| 3,548,259 | 12/1970 | McDonald . | |
| 4,197,567 | 4/1980 | Dietz et al. | 361/45 |
| 4,567,456 | 1/1986 | Legatti | 335/20 |
| 4,568,997 | 2/1986 | Bienwald et al. | 361/45 |
| 4,574,324 | 3/1986 | Packard | 361/46 |
| 4,931,893 | 6/1990 | Glennon et al. | 361/45 |
| 4,979,070 | 12/1990 | Bodkin | 361/42 |
| 5,229,730 | 7/1993 | Legatti et al. | 335/18 |
| 5,270,896 | 12/1993 | McDonald | 361/45 |

OTHER PUBLICATIONS

"RV4145 Low Power Ground Fault Interrupter", Raytheon Company, Semiconductor Division (Aug. 1988).

"Hubbell Wiring Devices Premise Wiring Products Kellems Products", Hubbell Incorporated, Catalog No. 101, pp. P-1 through P-17 (1990).

Model GFP-4C15 Schematic Diagram, Hubbell Incorporated, no date.

Model GFP-4C15 Schematic Diagram, Hubbell Incorporated, no date.

Model GFP-115A Schematic Diagram, Hubbell Incorporated, no date.

Model GFP-115A (Redesign) Schematic Diagram, Hubbell Incorporated.

*Primary Examiner*—Todd DeBoer
*Attorney, Agent, or Firm*—Jerry M. Presson; John E. Holmes

[57] ABSTRACT

An improved ground fault circuit interrupter (GFCI) device requires manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

30 Claims, 4 Drawing Sheets

MANUALLY SET GROUND FAULT CIRCUIT INTERRUPTER

FIELD OF THE INVENTION

The present invention relates to a ground fault circuit interrupter (GFCI) for protecting an AC load circuit. More specifically, tile invention relates to an improved GFCI which is designed to require manual setting following initial connection to an AC power source or termination of a power source interruption.

BACKGROUND OF THE INVENTION

Conventional GFCI devices are designed to trip in response to the detection of a ground fault condition at an AC load. Generally, the ground fault condition results when a person comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a circuit breaker within the GFCI device is immediately tripped to an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differential current when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration, as shown, for example, in U.S. Pat. No. 4,568,997, to Bienwald et al, includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again.

Although GFCI receptacles of the type described above can provide useful protection against electrical shock hazards, they are designed to trip only in response to a ground fault condition and not in response to other types of conditions which can also be dangerous. For example, although a broken neutral conductor in an AC power source will de-energize the load, the line side of the AC source is still energized and can create a shock hazard at the load. A conventional GFCI device will not detect this condition, since the broken neutral conductor disables the control circuitry within the GFCI device and renders it incapable of tripping. Similarly, when the electrical load is a power tool or some other type of power equipment that can cause injury when power is applied unexpectedly, the user may be endangered if power is removed (e.g., due to a circuit overload at a main fuse box or circuit breaker panel) and then restored while the equipment power switch is inadvertently left in the "on" position. Again, a conventional GFCI circuit provides no protection under these circumstances, because the power interruption does not trip the circuit breaker and does not prevent the circuit breaker from being reset even if it has already been tripped. In both of the situations mentioned, it would be desirable to employ a GFCI circuit which trips when the power supply is interrupted and cannot be reset until power is restored.

Portable GFCI devices have been designed for use in situations where the available AC power supply circuit does not include a central or receptacle-type GFCI device. These portable devices may be incorporated into line cords, extension cords or plug-in units, and are often used with power tools and other types of potentially hazardous power equipment at construction sites and the like. The need for a GFCI device which can be tripped by the absence of supply power is particularly great under these circumstances, not only because power equipment is more likely to be involved, but also because the connection of the GFCI device to the AC power receptacle can itself cause unexpected starting of the equipment if the power switch of the equipment has been left in the "on" position.

A number of GFCI circuits have been devised which are capable of being tripped and reset not only in response to a ground fault condition, but also in response to an undervoltage condition or a power supply interruption. Examples may be found in U.S. Pat. No. 3,548,259, to McDonald, and in U.S. Pat. No. 4,197,567, to Dietz et al. Although these circuits provide useful protection beyond that afforded by ordinary GFCI devices, they still rely on mechanical circuit breakers to trip in response to the undervoltage condition. Mechanical circuit breakers add undesirable complexity and expense to the GFCI circuit, and are also subject to failure due to the mechanical nature of the tripping and latching functions.

Newer types of GFCI devices employ relays, rather than circuit breakers or other types of mechanical latching devices, to interrupt the load power when a ground fault condition occurs. An electronic circuit controls the flow of current to the relay coil, and the relay contacts serve to open and close both sides of the AC line in response to the presence or absence of a ground fault condition. In these devices, only a simple momentary pushbutton switch is needed to perform the reset function, since the latching is performed electronically rather than mechanically. This results in a simpler, less expensive and more reliable device. Unfortunately, however, the nature of the circuit is such that it is set automatically when the GFCI device is initially connected to an AC power source, and after a power supply interruption. Ideally, it would be desirable to incorporate a manual set feature into a GFCI device of this type without relying on circuit breakers or other types of mechanical latching means.

SUMMARY OF THE INVENTION

A primary object of the present invention is to provide a GFCI device which requires manual setting upon initial connection to a power supply, and following termination of a power supply interruption, but which does not rely on circuit breakers or other mechanical latching devices.

A further object of the invention is to provide a GFCI device in which a simple momentary pushbutton switch can be employed to set the device upon initial connection to a power supply and termination of a power supply interruption.

A further object of the invention is to provide a manually set GFCI device in which the same momentary pushbutton switch that is used for setting the device upon initial connection to a power supply, and after termination of a power supply interruption, can also be used for resetting the GFCI device following termination of a ground fault condition.

Still another object of the present invention is to provide a manually set GFCI device which shares as many circuit components as possible with GFCI devices that are set automatically following initial connection to a power supply or termination of a power supply interruption.

Still another object of the present invention is to provide a GFCI device which is particularly suited to portable or line-cord applications, and which is simple and inexpensive in construction.

The foregoing objects are substantially achieved by providing a ground fault circuit interrupter which comprises first and second input terminals for connection to the line and neutral terminals, respectively, of an AC power source, and first and second output terminals for connection to line and neutral terminals, respectively, of an AC load. First and second conductive paths extend, respectively, between the first input terminal and the first output terminal and between the second input terminal and the second output terminal. A relay comprising a relay coil and first and second relay contact sets connected in the first and second conductive paths, respectively, is provided to selectively connect the input terminals to the output terminals when the contact sets are in a closed position, and to selectively disconnect the input terminals from the output terminals when the contact sets are in an open position. A relay coil circuit is provided for selectively energizing the relay coil in response to a control signal produced by a control signal source in order to maintain the first and second relay contact sets in a closed position, and for selectively de-energizing the relay coil in response to the absence of the control signal in order to maintain the first and second relay contact sets in an open position. A current sensing circuit senses the current flow through the first and second conductive paths and produces a trip signal when an imbalance in the current flow occurs that is indicative of a ground fault condition at the AC load. A load power sensing circuit is coupled to at least one of the first and second output terminals for producing a load power signal when power is being made available to the AC load. A trip circuit is connected to the current sensing circuit, the load power sensing circuit, and the relay coil circuit in order to open and close the relay contact sets. The trip circuit includes an input for receiving the control signal, and a controlled switching device responsive to the load power signal for applying the control signal to the relay coil circuit in order to maintain the relay contact sets in a closed position when power is being made available to the AC load and for removing the control signal from the relay coil circuit in order to open the relay contact sets when power is not being made available to the AC load. The trip circuit also includes a switching circuit that is responsive to the trip signal for removing the control signal from the relay coil circuit in order to open the relay contact sets in response to a ground fault condition, and a manual reset switch for restoring the relay control signal to the relay coil circuit and thereby closing the relay contact sets following termination of a ground fault condition. The manual reset switch also serves as a manual set switch for closing the relay contact sets following initial connection of the ground fault circuit interrupter to an AC power source, and for closing the relay contact sets following termination of a power supply interruption. In different embodiments of the invention, the manual reset switch may be connected so as to bypass the controlled switching device until the controlled switching device is rendered conductive by the load power sensing circuit, or it may be connected in such a manner as to temporarily render the controlled switching device conductive using a signal derived from the AC input terminals until a signal is available from the load power sensing circuit to maintain the controlled switching device in a conductive state. The controlled switching device may, for example, comprise an opto-isolator, a relay or a thyristor.

The present invention is also directed to a method for operating a ground fault circuit interrupter in order to require manual setting following initial connection to an AC power source or termination of a power source interruption. The method comprises the steps of making AC power from a power source available to a load through a circuit path, the continuity of which is maintained in response to the application of a control signal and interrupted in response to removal of the control signal; monitoring the power made available to the load; in the absence of a ground fault condition, applying the control signal through a controlled switching device in order to maintain the continuity of the circuit path, with the controlled switching device being rendered conductive while power is being made available to the load; removing the control signal in response to a ground fault condition in order the interrupt the circuit path and remove power from the load; rendering the controlled switching device nonconductive when no power is being made available to the load; restoring the control signal by operating a manual switch; and rendering the controlled switching device conductive in response to power being made available to the load. In one embodiment of the invention, the step of restoring the control signal includes the step of temporarily bypassing the controlled switching device using the manual switch. In another embodiment of the invention, the step of restoring the control signal includes the step of temporarily rendering the controlled switching device conductive using the manual switch.

BRIEF DESCRIPTION OF THE DRAWINGS

Referring now to the drawings, which form a part of the original disclosure.

DETAILED DESCRIPTION OF THE PREFERRED EMBODIMENTS

Figure 1:
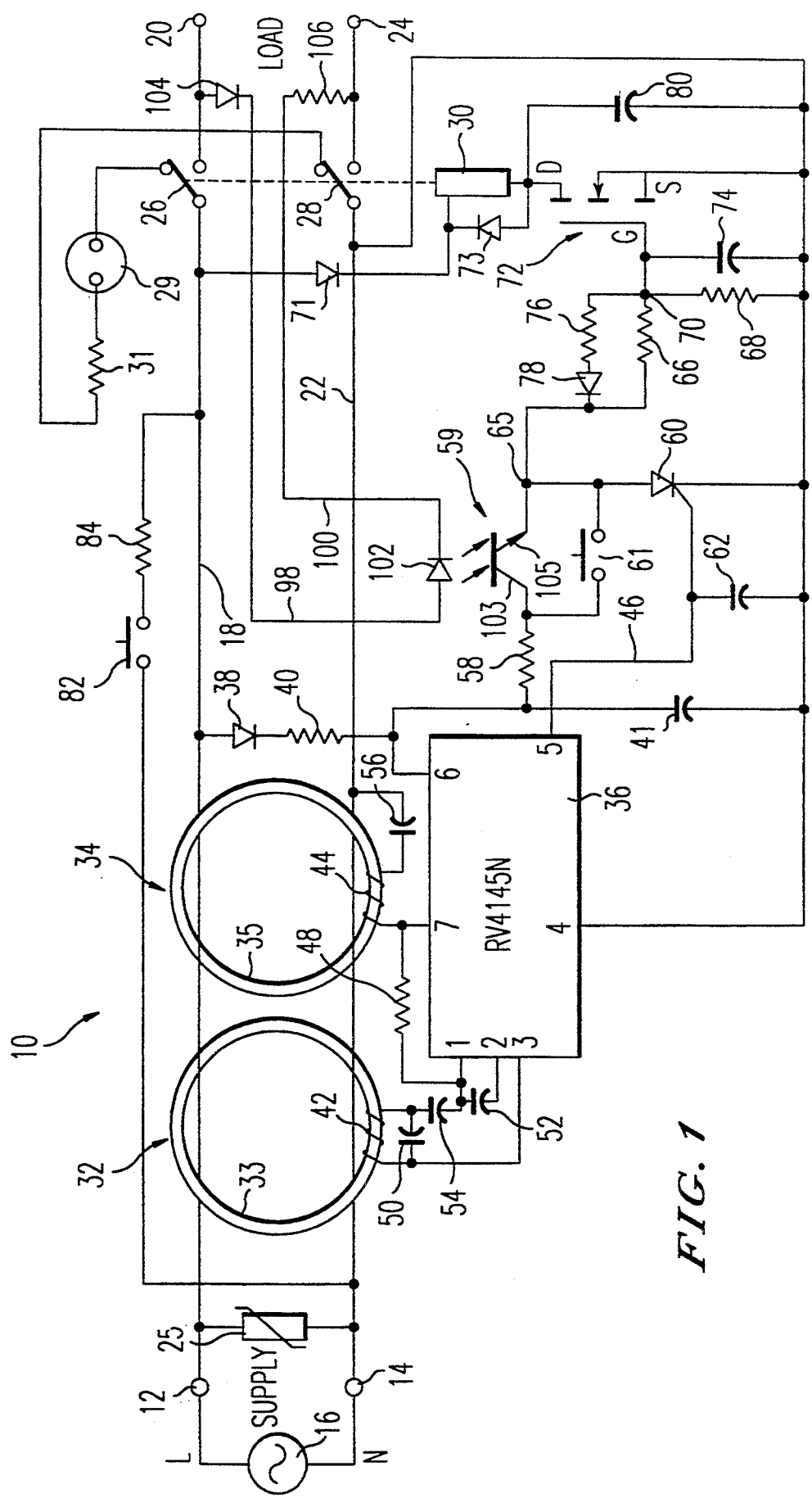
FIG. 1 is a schematic diagram of an improved GFCI device constructed in accordance with a first embodiment of the present invention, in which manual setting is required upon initial connection of the GFCI device to an AC power supply and following termination of a power supply interruption.

FIG. 1 illustrates a manually set ground fault circuit interrupter (GFCI) device constructed in accordance with a first embodiment of the present invention. The GFCI device 10 includes a pair of input terminals 12 and 14 which are adapted to be connected to the line (L) and neutral (N) terminals, respectively, of an AC power source 16. Within the GFCI device 10, a first conductor 18 connects the AC line input terminal 12 to a corresponding AC line output terminal 20, and a second conductor 22 connects the AC neutral input terminal 14 to a corresponding AC neutral output terminal 24. A transient voltage suppressor 25 is connected across the input terminals 12 and 14 to provide protection from voltage surges due to lightning and other transient conditions. The output terminals 20 and 24 are connected, respectively, to the line and neutral output terminals of an AC load (not shown). The conductive paths established by the conductors 18 and 22 are selectively made and broken by first and second relay contact sets 26 and 28, respectively, in order to selectively connect and disconnect the input terminals 12 and 14 from the output terminals 20 and 24. The relay contact sets 26 and 28 are operated simultaneously by an AC relay coil 30. Energization of the relay coil 30 causes both contact sets 26 and 28 to be held in the position opposite to that shown, thereby establishing continuous conductive paths between the input terminals 12, 14 and output terminals 20, 24 and delivering power from the AC source 16 to the load. When the relay coil 30 is de-energized, the relay contact sets 26 and 28 are both moved to the position illustrated in FIG. 1 by means of a biasing spring (not shown) within the relay, thereby interrupting the conductive paths 18 and 22 and removing AC power from the load. The relay coil 30 is de-energized in response to the detection of a ground fault condition, in a manner to be described below, and prevents an electrical shock hazard by immediately and simultaneously removing power from both sides of the AC load when such a condition is detected.

In the embodiment shown in FIG. 1, the relay contact sets 26 and 28 are each of the single-pole, double-throw (SPDT) type and, when in the position shown, serve to connect the AC line and neutral conductors 18 and 22 across a shunt path comprising a neon lamp 29 and a current limiting resistor 31 arranged in series. The lamp 29 provides a visual indication that the GFCI device 10 is off either because a ground fault has occurred or the device has not been set. For convenience, the position of the relay contact sets 26 and 28 shown in FIG. 1 will be referred to in the description which follows as the "open" position, and the opposite position as the "closed" position, since it is the opening and closing of the AC line and neutral conductors 18 and 22 that is of principal interest in understanding the operation of the GFCI device 10.

The detection of a ground fault condition is implemented by a current sensing circuit which comprises a pair of transformers 32 and 34, a commercially available GFCI controller 36, and various interconnecting components. The GFCI controller 36 is preferably a Type RV4145N integrated circuit manufactured by the Semiconductor Division of Raytheon Company, located in Mountain View, California. The GFCI controller 36 is powered from the AC input terminals 12 and 14 by means of a half-wave power supply comprising a diode 38, a current limiting resistor 40 and a filter capacitor 41. The conductors 18 and 22 pass through the magnetic cores 33 and 35 of the two transformers 32 and 34, as shown, with the secondary coil 42 of the transformer 32 being connected to the input of the GFCI controller 36 and the secondary coil 44 of the transformer 34 being connected between the GFCI controller 36 and the AC neutral conductor 22. The transformer 32 serves as a differential transformer for detecting a connection between the line side of the AC load and an earth ground (not shown), while the transformer 34 serves as a grounded neutral transformer for detecting a connection between the neutral side of the AC load and an earth ground. In the absence of a ground fault, the currents flowing through the conductors 18 and 22 will be equal and opposite, and no net flux will be generated in the core 33 of the differential transformer 32. In the event that a connection occurs between the line side of the AC load and ground, however, the current flowing through the conductors 18 and 22 will no longer precisely cancel and a net flux will be generated in the core 33 of the transformer 32. This flux will give rise to a potential at the output of the secondary coil 42, and this output is applied to the inputs of the GFCI controller 36 to produce a trip signal on the output line 46. If the ground fault condition results from the neutral side of the AC load accidentally being connected to ground, a magnetic path is established between the differential transformer 32 and the grounded neutral transformer 34. When this occurs, a positive feedback loop is created around an operational amplifier within the GFCI controller 36, and the resulting oscillations of the amplifier will likewise give rise to the trip signal on line 46.

Since the GFCI controller 36 is a commercially available component, its operation is well known and need not be described in detail. In utilizing this device, the resistor 48 serves as a feedback resistor for setting the gain of the controller and hence its sensitivity to normal faults. Capacitors 50 and 52 provide noise filtering at the inputs of the controller, and capacitor 54 provides AC input coupling. Capacitor 56 serves as a portion of the oscillatory circuit for the grounded neutral transformer 34.

In the absence of a ground fault condition, no output is produced by the GFCI controller 36 on line 46. Under these circumstances, current flows from the half-wave power supply formed by the diode 38, resistor 40 and filter capacitor 41 and then passes through a trip circuit to provide a control signal input to a further circuit which controls the energization of the relay coil 30. The trip circuit comprises a limiting resistor 58 connected to the positive terminal of the filter capacitor 41, a controlled switching device in the form of an opto-isolator 59 having its collector connected to the opposite terminal of the resistor 58, a momentary normally-open pushbutton switch 61 connected across the collector and emitter of the opto-isolator 59 to serve as a reset switch, and a switching or shunting circuit in the form of a silicon controlled rectifier (SCR) 60 having its anode connected to the emitter of the opto-isolator 59 and its cathode connected to the neutral conductor 22. The node 65 between the emitter of the opto-isolator 59 and the anode of the SCR 60 serves as the output of the trip circuit and the input to a biasing and control circuit for the relay coil 30. The gate of the SCR 60 is connected to the output line 46 of the GFCI controller 36. A capacitor 62 is connected between the gate of the SCR 60 and the AC neutral conductor 22 to serve as a filter for preventing narrow noise pulses from triggering the SCR. In the absence of a gating signal on line 46, the SCR 60 does not conduct and current from the half-wave power supply 38, 40, 41 passes through the resistor 58 and opto-isolator 59 to serve as a control signal for energizing the relay coil circuit in a manner to be described shortly. When a ground fault condition occurs, however, the GFCI controller 36 causes the output line 46 to go high, thereby gating the SCR 60 into conduction, shorting the emitter of the opto-isolator 59 directly to the AC neutral conductor 22, and thus removing the control signal from the input of the relay coil circuit. Removal of the control signal from the relay coil circuit causes the relay coil 30 to become de-energized, thereby opening the relay contact sets 26 and 28 and removing AC power from the load terminals 20 and 24.

As is well known, an SCR will continue to conduct as long as current flows between its anode and cathode, even after the gating signal is removed. Thus, the SCR 60 will continue to maintain the relay coil 30 in a de-energized condition, and the contact sets 26 and 28 open, even after the ground fault condition has disappeared and the output of the GFCI controller 36 on line 46 has been restored to a zero voltage level. Thus, the operation of the circuit 10 is similar to that of a receptacle-type GFCI device employing a mechanical circuit breaker, in that disappearance of the ground fault condition does not restore power to the AC load until a manual reset button is pushed. In the circuit of FIG. 1, however, no circuit breaker is required and the reset switch 61 may comprise a simple momentary pushbutton switch as shown.

As noted previously, the node 65 between the emitter of the opto-isolator 59 and the anode of the SCR 60 corresponds to the input of a circuit which controls the energization of the relay coil 30. This circuit includes resistors 66 and 68, which are connected in series between the node 65 and the AC neutral conductor 22 to form a voltage divider. The node 70 between the two resistors is connected to the gate input (G) of a metal-oxide-semiconductor field effect transistor (MOSFET) 72, and the source terminal (S) of the MOSFET 72 is connected to the AC neutral conductor 22. The drain terminal (D) of the MOSFET 72 is connected to one side of the relay coil 30, and the opposite side of the relay coil 30 is connected to the AC line conductor 18. Thus, when the MOSFET 72 is gated into conduction, AC current will flow through the relay coil 30 and maintain the relay contact sets 26 and 28 in a closed position. When the relay coil 30 is de-energized by rendering the MOSFET 72 nonconductive, the relay contact sets 26 and 28 will open to remove power from the AC load. In the illustrated embodiment, a diode 71 is connected in series between the AC line conductor 18 and the relay coil 30 to limit the current flow in the relay coil to positive half-cycles of the AC power source. This is done simply to reduce power dissipation and is not essential. A second diode 73 is connected across the relay coil 30 to provide a path for reactive currents during the nonconducting intervals of the diode 71.

The gating of the MOSFET 72 in the relay coil circuit is controlled by the voltage at the node 70 between the voltage divider resistors 66 and 68, and this voltage will in turn depend upon the presence of control signal at the input node 65 of the relay coil circuit as determined by the state of the SCR 60 of the trip circuit. The values of voltage divider resistors 66 and 68 are chosen so that the proper gate voltage is applied to the MOSFET 72 when the control signal is present. A filter capacitor 74 is connected between the gate terminal of the MOSFET 72 and the AC neutral conductor 22, in order to prevent the MOSFET 72 from being gated by noise pulses. A resistor 76 and diode 78 allow the capacitor 74 to discharge quickly when the SCR 60 goes into conduction; thereby allowing for a rapid turn-off of the MOSFET 72. A capacitor 80 is connected between the drain and source terminals of the MOSFET 72 in order to prevent the MOSFET from being triggered into conduction by rapid changes in the drain-to-source voltage, a phenomenon known as dV/dT triggering.

In addition to the reset switch 61, whose operation will be explained shortly, a second normally-open, momentary pushbutton switch 82 is provided to allow the user to test the operation of the GFCI device. The pushbutton switch 82 is connected in series with a current limiting resistor 84, and the series connection of the switch 82 and resistor 84 is connected between the AC line conductor 18 on the load side of the transformers 32 and 34, and the AC neutral conductor 22 on the supply side of the transformers 32 and 34. When the switch 82 is momentarily depressed, sufficient current will flow through the resistor 84 to cause an imbalance in the current flowing through the primary coil of the transformer 32. This will simulate a ground fault condition, causing the GFCI controller 36 to produce an output signal on line 46 that de-energizes the relay coil 30 by rendering the SCR 60 conductive and the MOSFET 72 nonconductive. The relay contact sets 26 and 28 will open, and can be closed again by depressing the reset switch 61. If this sequence of events does not occur, the user will be alerted to the fact that the circuit 10 is defective and requires repair or replacement.

In accordance with the present invention, a manual set feature is provided which requires the GFCI device 10 to be manually set when the device is initially connected to the AC power supply 16 or after an interruption in the AC power supply. Advantageously, the switch which is provided in order to implement the manual set feature also serves as a reset switch for resetting the GFCI device 10 following termination of a ground fault condition. These objects are achieved, in part, by means of the previously-described controlled switching device 59, which is placed in series between the resistor 58 and node 65, as illustrated in FIG. 1, in order to selectively apply the control signal from the trip circuit to the voltage divider resistors 66 and 68 of the relay coil circuit. As already noted, the controlled switching device 59 comprises an opto-isolator in the embodiment of FIG. 1. The input or control terminals 98 and 100 of the opto-isolator 59 are connected to an internal light-emitting diode (LED) 102 which permits current to flow between the output terminals 103 and 105 of the opto-isolator when the LED 102 is forward-biased. In the circuit of FIG. 1, the input terminals 98 and 100 of the opto-isolator are connected across the load terminals 20 and 24 of the GFCI device 10 in order to form a load power sensing circuit for detecting the availability of AC power at the load terminals. A diode 104 is placed in series between the AC line output terminal 20 and the positive opto-isolator input terminal 98 to limit the reverse-bias potential across the LED 102. A resistor 106 is placed in series between the negative opto-isolator input terminal 100 and the AC neutral load terminal 24 to limit the current flow through the LED 102. The momentary pushbutton switch 61 is connected across the output terminals 103 and 105 of the opto-isolator as shown. The momentary pushbutton switch 61 is normally open, and when depressed establishes a short circuit between the resistor 58 and the node 65 in order the bypass the opto-isolator 59.

In the absence of a ground fault condition, the control signal current flowing from the resistor 58 passes through the opto-isolator 59 to the node 65 and voltage divider resistors 66 and 68, thereby rendering the MOSFET 72 conductive and energizing the relay coil 30 in order to maintain the relay contact sets 26 and 28 in the closed position. With the contact sets 26 and 28 closed, current from the AC power source 16 flows through the diode 104, LED 102 and resistor 106, thereby providing a load power signal which maintains the opto-isolator 59 in a conductive state whenever power is being made available at the load terminals 20 and 24. (The opto-isolator 59 actually conducts only during the positive half-cycles of the AC potential at the load terminals 20 and 24, but the capacitor 74 is of sufficient size to maintain the MOSFET 72 in conduction during the brief intervals in which the opto-isolator 59 is not conducting.) When a ground fault condition is detected by the GFCI controller 36, the MOSFET 72 becomes nonconductive when the SCR 60 is gated into conduction, and de-energizes the relay coil 30. This causes the relay contact sets 26 and 28 to open, thereby removing power from both sides of the AC load. The opening of the relay contact sets 26 and 28 also removes power from the input terminals 98 and 100 of the opto-isolator 59, thereby causing the opto-isolator 59 to become nonconductive and the SCR 60 to turn off. Termination of the ground fault condition will not reset the GFCI device 10, since current cannot flow to the relay coil 30 until the opto-isolator 59 has been restored to a conducting state. Reset is accomplished by momentarily depressing the reset switch 61, which bypasses the opto-isolator 59 and permits current to flow through the relay coil 30 for a period sufficient to close the relay contact sets 26 and 28. As soon as these contact sets are closed, power is again applied to the input terminals 98 and 100 of the opto-isolator 59, which places the opto-isolator 59 into conduction. The reset button 61 can then be released without causing the relay contact sets 26 and 28 to open. Since the ground fault condition has been terminated, the SCR 60 is no longer being gated by the output 46 of the GFCI controller 36, and hence the current flowing through the reset switch 61 or opto-isolator 59 is not shunted to the AC neutral conductor 22. However, if reset is attempted while the ground fault condition is still in effect, the SCR 60 will begin conducting since it is still receiving a gating signal from the GFCI controller 36. Therefore, the current passing through the reset switch 61 or opto-isolator 59 will be shunted directly to the AC neutral conductor 22 by the SCR 60, and the potential on node 65 will be insufficient to energize the relay coil 30. Thus, it will be appreciated that the electronic latching action of the SCR 60 provides for a manual reset function following termination of a ground fault condition without the need to rely on circuit breakers or other mechanical latching devices. Since no mechanical latching is involved, the reset button 61 may comprise a simple momentary pushbutton as shown, thereby simplifying the GFCI device considerably.

The manner in which the improved GFCI device 10 of FIG. 1 also provides a manual set feature following initial connection to an AC power supply or termination of a power supply interruption will now be evident. Since the input terminals 98 and 100 of the opto-isolator 59 are connected (via the diode 104 and resistor 106) to the AC line and neutral conductors 18 and 22 on the load side of the relay contact sets 26 and 28, they will not be energized unless power is being supplied by the AC source 16 and the contact sets 26 and 28 are closed. The contact sets 26 and 28, in turn, cannot close unless current is initially provided to the relay coil 30 by operating the reset switch 61 to place the opto-isolator 59 into conduction. In other words, after the input terminals 12 and 14 of the GFCI device 10 are initially connected to the AC power source 16 (e.g., by plugging the GFCI device into a wall receptacle in portable embodiments), AC power will not appear at the output terminals 20 and 24 until the pushbutton 61 is depressed momentarily. Similarly, an interruption in the AC power from the source 16 will remove power from the output terminals 20 and 24 by de-energizing the relay coil 30 for a period sufficient to allow the contact sets 26 and 28 to open, and this will cause the opto-isolator 59 to become nonconductive. Power will not be restored until the reset switch 61 is momentarily depressed to close the contact sets 26, 28 and thereby return the opto-isolator 59 to a conductive state. In both of the situations described (i.e., initial connection to an AC power source and temporary interruption of the AC power source), the neon lamp 29 will illuminate whenever AC power is not being made available at the load terminals 20 and 24. Thus, the neon lamp 29 serves not only to indicate that a ground fault has occurred, as described previously, but also indicates when manual setting of the GFCI device is needed in order to provide AC power to the output terminals 20 and 24.

It will be appreciated that the GFCI device 10 of FIG. 1 achieves the desired result of requiring manual setting following initial connection to an AC power supply, or following termination of an AC power supply interruption, with a minimum number of components. The opto-isolator 59, diode 104 and resistor 106 are the only components required for the manual set function that would not be needed if the circuit 10 were merely required to be reset following termination of a ground fault condition (for the latter type of operation, the resistor 58 can be connected directly to the node 65). The reset switch 61 would still be required in order to reset the GFCI device after a ground fault, but would be located at a different point in the circuit (e.g., across the anode and cathode of the SCR 60). As already noted, the improved GFCI device 10 of FIG. 1 is advantageous not only because of the relatively small number of components required for the manual set function, but also because a single momentary switch 61 performs all of the desired set and reset functions.

The opto-isolator 59 of FIG. 1 may take a variety of forms. In the embodiment shown, the portion of the opto-isolator through which the controlled current flows comprises a phototransistor, with the output terminals 103 and 105 comprising the collector and emitter terminals, respectively, of the phototransistor. In other embodiments, however, this portion of the opto-isolator may comprise a thyristor, such as a silicon controlled rectifier (SCR) or a triac, or a field-effect transistor (FET). Any of these devices may be employed in place of the opto-isolator 59 shown in FIG. 1. The desirable feature of all of these devices, in the context of the present invention, is that they provide electrical isolation between the load or output terminals 20 and 24 of the GFCI device 10 and the internal control circuitry of the GFCI device 10. Thus, a failure or defect in the internal circuitry of the GFCI device 10 cannot cause the load terminals 20 and 24 to become connected to the AC source 16 when the relay contact sets 26 and 28 are in the open position. This is a desirable safety feature in a GFCI device.

Figure 2:
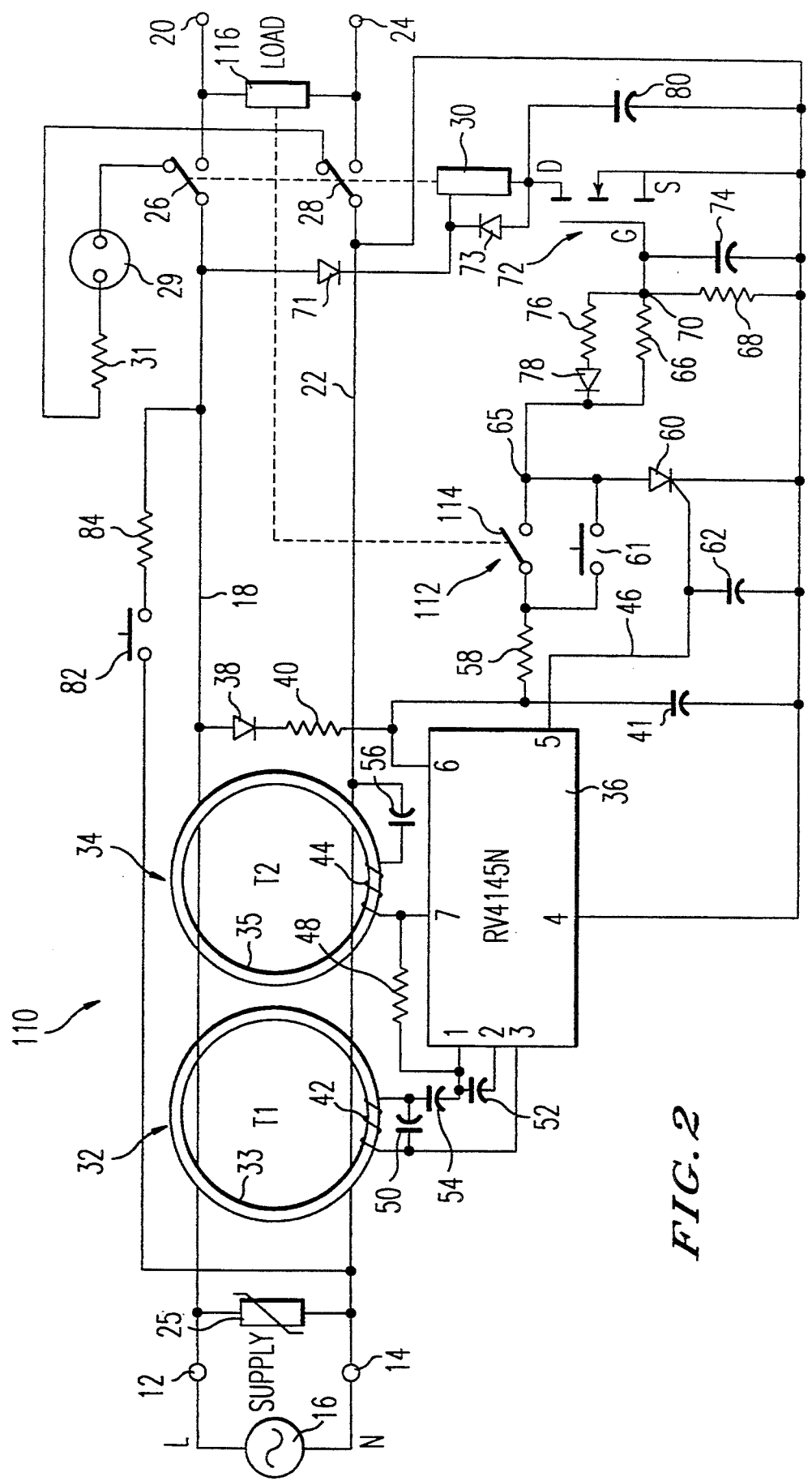
FIG. 2 is a schematic diagram of an improved GFCI device constructed in accordance with a second embodiment of the present invention.

FIG. 2 illustrates a GFCI device 110 constructed in accordance with a second embodiment of the present invention. This embodiment uses many of the same components as that of FIG. 1, and the same reference numerals have been used for these components. In the embodiment of FIG. 2, however, the controlled switching device comprises a single-pole, single-throw (SPST) AC relay 112 having its contacts 114 in series between the resistor 58 and the node 65. The coil 116 of the relay 112 is connected across the load or output terminals 20 and 24 of the GFCI device 110 as shown. The relay contacts 114 are normally biased to the open position when the relay coil 116 is de-energized, and are closed when the relay coil 116 is energized by the AC source 16. Energization of the relay coil 116 will occur when the AC source 16 is operative and when the relay contact sets 26 and 28 are closed. It will be appreciated that this embodiment operates in substantially the same manner as the embodiment of FIG. 1, with the relay coil 116 serving as a load sensing circuit for closing the relay contacts 114 only when AC power is being made available to the load at the output terminals 20 and 24. Since the coupling between the relay coil 116 and the relay contacts 114 is magnetic, rather than electrical, the desired isolation is provided between the load terminals 20 and 24 and the internal circuitry of the GFCI device 110 as in the embodiment of FIG. 1.

Figure 3:
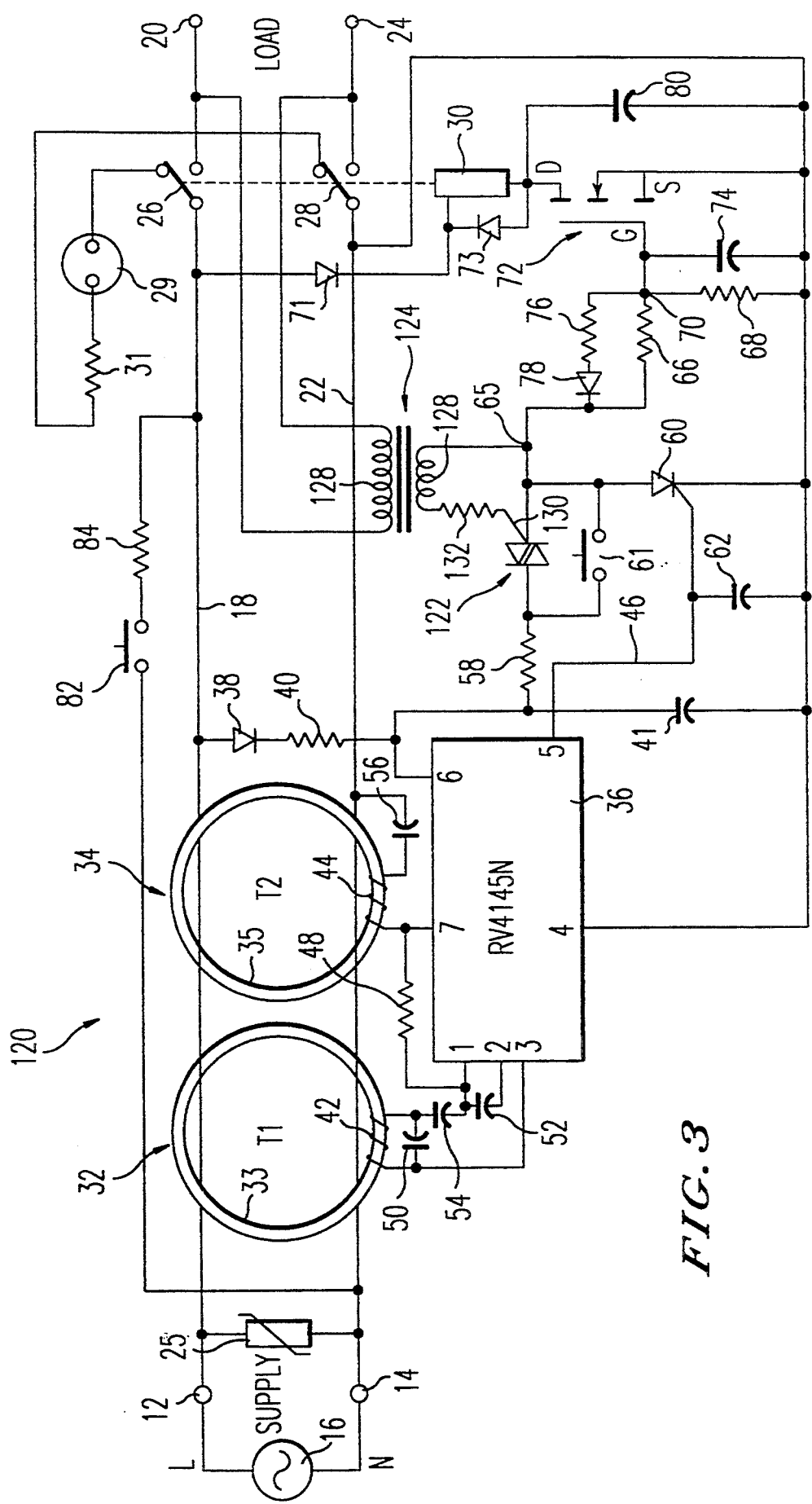
FIG. 3 is a schematic diagram of an improved GFCI device constructed in accordance with a third embodiment the present invention.

FIG. 3 illustrates a GFCI circuit 120 constructed in accordance with a third embodiment of the present invention. Once again, common reference numerals have been used for components which are the same as those in FIGS. 1 and 2. In the embodiment of FIG. 3, the controlled switching device that is connected between the resistor 58 and the node 65 comprises a bilateral thyristor or triac 122. A transformer 124 has its primary coil 126 connected across the output terminals 20 and 24 of the GFCI device 120, and its secondary coil 128 connected between the node 65 and the gate 130 of the triac. A resistor 132 is provided in the triac gate circuit to limit the gating current. The turns ratio of the transformer 124 is such that the magnitude of the AC voltage across the output terminals 20 and 24 is stepped down to a level suitable for use as the gating potential to the triac 122. The magnetic coupling within the transformer 124 provides the desired electrical isolation between the load or output terminals 20 and 24 of the GFCI device 120 and the internal circuitry of the GFCI device 120. If desired, the triac 122 may be replaced with an SCR having its anode connected to the resistor 58 and its cathode connected to node 65. Other types of controlled switching devices may also be used.

Figure 4:
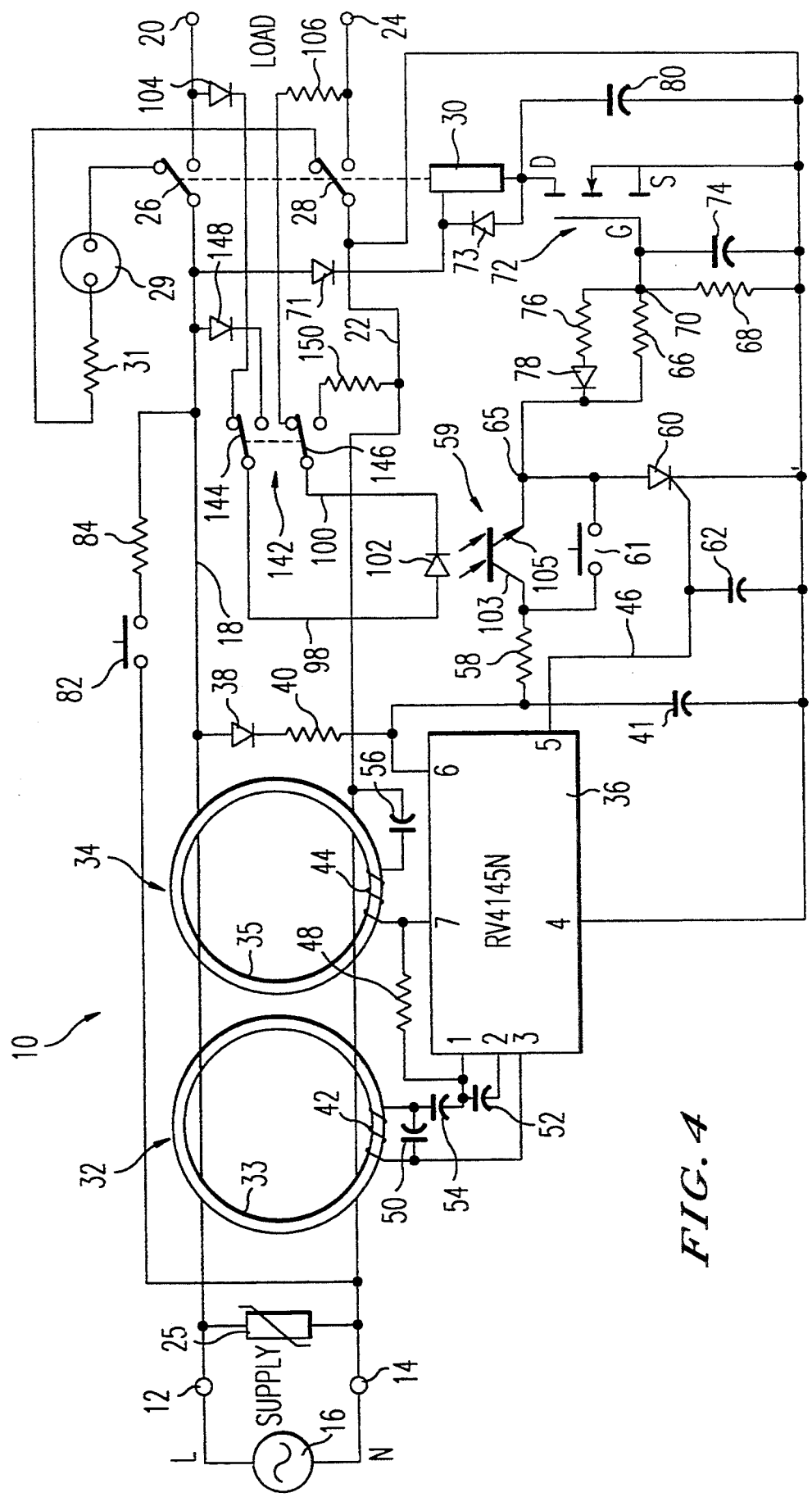
FIG. 4 is a schematic diagram of an improved GFCI device constructed in accordance with a fourth embodiment of the present invention.

FIG. 4 illustrates a GFCI circuit 140 constructed in accordance with a fourth embodiment of the present invention. This embodiment is similar to that of FIG. 1, in that an opto-isolator 59 is used as the controlled switching device, and common reference numerals have been used for other components which are the same as those in FIGS. 1-3. In the embodiment of FIG. 4, however, the reset switch 61 of the previous embodiments has been replaced with a momentary double-pole, double throw pushbutton switch 142 connected into the input side of the opto-isolator 59. The contacts 144 and 146 of the switch 142 are normally biased in the position shown, and in this position the input terminals 98 and 100 of the opto-isolator 59 are connected to the load terminals 20 and 24 through the diode 104 and resistor 106. When the relay contact sets 26 and 28 open in response to a ground fault condition or an AC power interruption, the opto-isolator 59 becomes nonconductive in the same manner as it does in the embodiment of FIG. 1, and must be rendered conductive in order to restore AC power to the load terminals 20 and 24. This is accomplished in the embodiment of FIG. 4 not by temporarily bypassing the output terminals of the opto-isolator 59, as is done in the embodiment of FIG. 1 using the reset switch 61, but instead by temporarily energizing the input terminals 98 and 100 of the opto-isolator 59 from a source other than the load terminals 20 and 24. This is achieved by momentarily depressing the reset switch 142 to move the contacts 144 and 146 to the position opposite to that shown, in order to temporarily connect the input terminals 98 and 100 of the opto-isolator 59 to the AC line and neutral conductors 18 and 22. A diode 148 and resistor 150 are placed in series with the input terminals 98 and 100 of the opto-isolator 59 when the contacts 144 and 146 are in this position, and these components serve the same purposes as the diode 104 and resistor 106 of FIG. 1. With the reset switch 142 depressed, the opto-isolator 59 will be rendered conductive by the AC line and neutral conductors 18 and 22, thereby gating the MOSFET 72 into conduction, energizing the relay coil 30, and closing the relay contact sets 26 and 28. The reset switch 142 may then be released, and the input terminals 98 and 100 of the opto-isolator 59 will continue to be energized by the AC power now being applied to the output terminals 20 and 24 through the closed relay contact sets 26 and 28. Although the input terminals 98 and 100 of the opto-isolator are briefly de-energized while the contacts 144 and 146 are moving from one position to the other during release of the reset switch 142, the capacitor 74 maintains the MOSFET 72 in conduction during this interval. Thus, the relay coil 30 remains energized and the relay contact sets 26 and 28 remain closed. Once the reset switch 142 is fully released, the circuit is restored to the configuration shown in FIG. 4 and the opto-isolator 59 is maintained in conduction by the AC potential at the load terminals 20 and 24. As in the previous embodiments, the reset switch 142 allows the GFCI device 140 to be reset following termination of a ground fault condition, and also allows the GFCI device 140 to be manually set following initial connection to an AC power supply or termination of a power supply interruption. Although FIG. 4 has been described as a modification of FIG. 1, it will be apparent that the embodiments of FIGS. 2 and 3 can, if desired, be modified in a similar manner to employ a reset switch 142 at the input of the controlled switching device used in those embodiments.

Preferred values for the electrical components used in the GFCI circuits of FIGS. 1, 2, 3 and 4 are provided in Table 1 below. Resistor values are expressed in ohms ($\Omega$), kilohms (K) or megohms (M). All resistors are ¼-watt unless otherwise noted. Capacitor values are expressed in microfarads ($\mu F$).

TABLE 1

| Component | Value or Type |
| --- | --- |
| Resistors 31, 106, 150 | 33K |
| Diodes 38, 78, 104, 148 | 1N4005 |
| Resistor 40 | 12K (1 Watt) |
| Capacitors 41, 54, 74 | 10 $\mu F$ (25 volts) |
| Resistor 48 | 1.0 m |
| Capacitors 50, 56 | 0.01 $\mu F$ (25 volts) |
| Capacitor 52 | 0.001 $\mu F$ (25 volts) |
| Resistor 58 | 2.2K |
| Opto-isolator 59 | 4N36 |
| SCR 60 | Teccor EC103 |
| Capacitor 62 | 3.3 $\mu F$ (10 volts) |
| Resistors 66, 68 | 22K |
| MOSFET 72 | Siliconix VN50300L |
| Resistor 76 | 22 |
| Capacitor 80 | 0.0022 $\mu F$ (500 Volts min.) |
| Resistor 82 | 15K |
| Triac 122 | Teccor Q201E3 |
| Transformer 124 | 20:1 |
| Resistor 132 | 10K |

The GFCI devices of FIGS. 1 through 4 may be employed in any desired manner to protect an AC load circuit against ground fault conditions and power supply interruptions. Thus, for example, a single GFCI device may be connected to a fuse box or circuit breaker panel to provide central protection for the AC wiring throughout a residential or commercial structure, or separate GFCI devices may be incorporated into AC receptacles placed at various locations in the structure. In a preferred application, however, the GFCI devices are made portable so that they can be employed at construction sites and other locations where ground fault protection does not already exist. One form of portable GFCI device consists of a short line cord or extension cord having a male plug at one end, a female plug at the other end, and a small weatherproof electrical box containing the GFCI circuit. The outside panel of the electrical box carries the lamp 29, reset switch 61 and test switch 82. The switches 61 and 82 may be of the membrane or keypad type to facilitate sealing of the electrical box. In another implementation, the electrical box may itself carry one or more female electrical outlets or receptacles for accepting the male plugs of AC load devices, and a line cord may be used to connect the electrical box to an unprotected AC receptacle. In a further implementation, the GFCI device may be incorporated into a small plug-in unit which can be connected directly to an unprotected AC receptacle without a line cord, with one or more female outlets provided on the outside of the plug-in unit for accommodating the male plugs of AC load devices. In a still further implementation, the GFCI device may be incorporated into a male plug which can be attached directly to the line cord of an AC load device or to an extension cord, so that the GFCI device becomes a permanent part of the line cord or extension cord.

While only a limited number of exemplary embodiments have been chosen to illustrate the present invention, it will be understood by those skilled in the art that various changes and modifications can be made therein. All such changes and modifications are intended to fall within the spirit and scope of the invention as defined in the appended claims.

What is claimed is:

1. A ground fault circuit interrupter requiring manual setting following connection to a power source or termination of a power source interruption, comprising:

first and second input terminals for connection to the line and neutral terminals, respectively, of an AC power source;

first and second output terminals for connection to the line and neutral terminals, respectively, of an AC load;

first and second conductive paths extending, respectively, between said first input terminal and said first output terminal and between said second input terminal and said second output terminal;

a relay comprising a relay coil and first and second relay contact sets, said first and second relay contact sets being connected in said first and second conductive paths, respectively, in order to selectively connect said input terminals to said output terminals when said contact sets are in a closed position and to selectively disconnect said input terminals from said output terminals when said contact sets are in an open position;

a relay coil circuit for selectively energizing said relay coil in response to a control signal in order to maintain the first and second relay contact sets in a closed position, and for selectively de-energizing the relay coil in response to the absence of said control signal in order to maintain the first and second relay contact sets in an open position;

a source for producing said control signal;

a current sensing circuit for producing a trip signal in response to an imbalance in the current flow through said first and second conductive paths that is indicative of a ground fault condition at an AC load connected to said first and second output terminal;

a load power sensing circuit coupled to at least one of said first and second output terminals for producing a load power signal when power is being made available at said first and second output terminals;

a trip circuit connected to said current sensing circuit, said load power sensing circuit and said relay coil circuit for opening and closing said relay contact sets, said trip circuit including an input for receiving said control signal, a controlled switching device responsive to said load power signal for applying said control signal to said relay coil circuit in order to maintain said relay contact sets in a closed position when power is being made available at said first and second output terminals and for removing said control signal from said relay coil circuit in order to open said relay contact sets when power is not being made available at said output terminals, a switching circuit responsive to said trip signal for removing said control signal from said relay coil circuit in order to open said relay contact sets in response to a ground fault condition, and a manual reset switch for restoring said control signal to said relay coil circuit and thereby closing said relay contact sets following termination of a ground fault condition, said manual reset switch also serving as a manual set switch for closing said relay contacts following connection of said ground fault circuit interrupter to an AC power source or following termination of an AC power source interruption.

2. A ground fault circuit interrupter as claimed in claim 1, wherein said controlled switching device provides electrical isolation between said input terminals and said output terminals when said relay contact sets are in an open position.

3. A ground fault circuit interrupter as claimed in claim 2, wherein said controlled switching device comprises an opto-isolator having input terminals connected to said load power sensing circuit and output terminals connected in said trip circuit.

4. A ground fault circuit interrupter as claimed in claim 3, wherein said load power sensing circuit further comprises a diode and a limiting resistor in series with the input terminals of said opto-isolator.

5. A ground fault circuit interrupter as claimed in claim 2, wherein said controlled switching device comprises a relay having a coil connected to said load power sensing circuit and contacts connected in said trip circuit.

6. A ground fault circuit interrupter as claimed in claim 2, wherein said controlled switching device comprises a thyristor having a gate terminal coupled to said load power sensing circuit and output terminals connected in said trip circuit.

7. A ground fault circuit interrupter as claimed in claim 6, wherein said load power sensing circuit includes a stepdown transformer having its primary side connected across said first and second output terminals and its secondary side coupled to the gate terminal of said thyristor.

8. A ground fault circuit interrupter as claimed in claim 6, wherein said thyristor comprises a triac.

9. A ground fault circuit interrupter as claimed in claim 1, wherein said source for producing said control signal is coupled to said input terminals in order to derive said control signal from said AC power source.

10. A ground fault circuit interrupter as claimed in claim 9, wherein said source for producing said control signal comprises a diode rectifier circuit.

11. A ground fault circuit interrupter as claimed in claim 1, wherein said manual reset switch comprises a momentary pushbutton switch.

12. A ground fault circuit interrupter as claimed in claim 1, wherein said manual reset switch is operative to bypass said controlled switching device in order to restore said control signal to said relay coil circuit and thereby close said relay contact sets.

13. A ground fault circuit interrupter as claimed in claim 12, wherein said controlled switching device includes a pair of output terminals, and wherein said manual reset switch is connected across the output terminals of said controlled switching device.

14. A ground fault circuit interrupter as claimed in claim 1, wherein said manual reset switch is operative to render said controlled switching device conductive in order to restore said control signal to said relay coil circuit and thereby close said relay contact sets.

15. A ground fault circuit interrupter as claimed in claim 14, wherein said controlled switching device includes a pair of input terminals connected to said load power sensing circuit, and wherein actuation of said manual reset switch causes the input terminals of said controlled switching device to be connected to an alternate signal source in order to render said controlled switching device conductive.

16. A ground fault circuit interrupter as claimed in claim 15, wherein said alternative signal source is coupled to said first and second AC input terminals in order to derive a signal from said AC power source for rendering said controlled switching device conductive.

17. A ground fault circuit interrupter as claimed in claim 16, wherein said controlled switching device comprises an opto-isolator, and wherein said alternate signal source comprises a diode and a limiting resistor in series with the input terminals of said opto-isolator.

18. A ground fault circuit interrupter as claimed in claim 1, wherein said relay coil circuit comprises a transistor switch for controlling the energization of said relay coil in response to the presence or absence of said control signal, and wherein said relay coil is coupled to said first and second conductive paths through said transistor switch so as to be energized by current drawn from said AC power source.

19. A ground fault circuit interrupter as claimed in claim 18, wherein said transistor switch comprises a metal-oxide-semiconductor field effect transistor (MOSFET).

20. A ground fault circuit interrupter as claimed in claim 1, wherein said switching circuit comprises a shunt circuit for shunting said control signal away from said relay coil circuit in order to open said relay contact sets in response to a ground fault condition.

21. A ground fault circuit interrupter as claimed in claim 20, wherein said shunt circuit includes a thyristor having a gate terminal coupled to said current sensing circuit for receiving said trip signal, and an output terminal connected to a common node between an output terminal of said controlled switching device and an input of said relay coil circuit.

22. A ground fault circuit interrupter as claimed in claim 21, wherein said thyristor comprises a silicon controlled rectifier (SCR).

23. A ground fault circuit interrupter as claimed in claim 1, wherein said load power sensing circuit is connected across said first and second output terminals in order to sense the voltage across said output terminals.

24. A ground fault circuit interrupter as claimed in claim 1, wherein said relay, said current sensing circuit, said load power sensing circuit and said trip circuit are enclosed in a portable housing for connection to an AC power receptacle.

25. A method for operating a ground fault circuit interrupter in order to require manual setting following connection to a power source or termination of a power source interruption, comprising the steps of:

making AC power from a power source available to a load through a circuit path, the continuity of said circuit path being maintained in response to the application of a control signal and interrupted in response to the removal of said control signal;

monitoring the power made available to the load;

in the absence of a ground fault condition, applying said control signal through a controlled switching device in order to maintain the continuity of said circuit path, said controlled switching device being rendered conductive when power is being made available to the load;

removing said control signal in response to a ground fault condition in order to interrupt said circuit path and remove power from the load;

rendering said controlled switching device nonconductive when no power is being made available to the load;

restoring said control signal by operating a manual switch; and rendering said controlled switching device conductive in response to power being made available to said load.

26. A method for operating a ground fault circuit interrupter as claimed in claim 25, wherein the step of restoring said control signal includes the step of temporarily bypassing said controlled switching device using said manual switch.

27. A method for operating a ground fault circuit interrupter as claimed in claim 25, wherein the step of restoring said control signal includes the step of temporarily rendering said controlled switching device conductive using said manual switch.

28. A method for operating a ground fault circuit interrupter as claimed in claim 27, wherein the step of temporarily rendering said controlled switching device conductive comprises the step of coupling a control input of said controlled switching device to said power source by operating said manual switch.

29. A method for operating a ground fault circuit interrupter as claimed in claim 25, wherein the step of monitoring the power made available to the load includes the step of maintaining electrical isolation between the power source and the load when said circuit path is interrupted.

30. A method for operating a ground fault circuit interrupter as claimed in claim 25 further comprising the step of deriving said control signal from said power source.

* * * * *